G. H. PFEIL.
ELECTRIC MOTOR.
APPLICATION FILED FEB. 4, 1910.
989,798.
Patented Apr. 18, 1911.
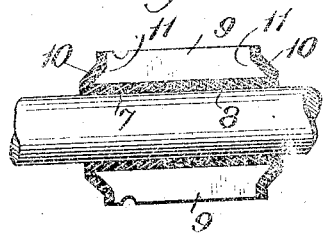
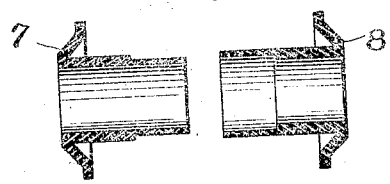
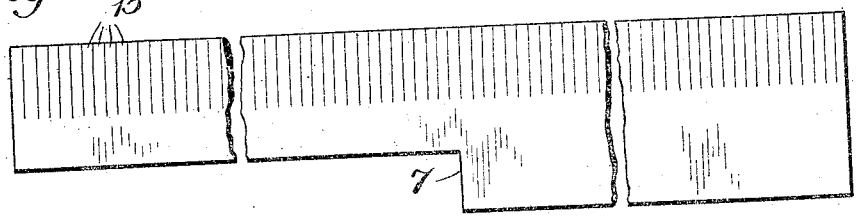
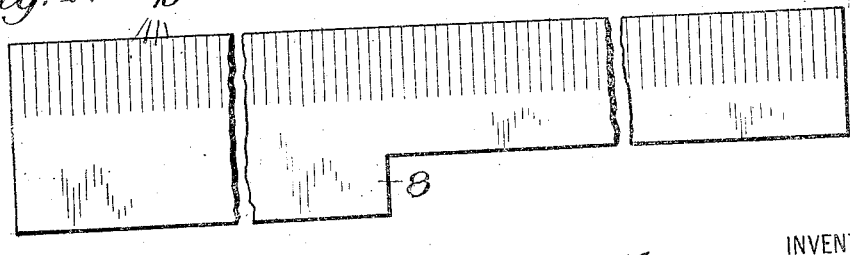
WITNESSES:
A. L. Vencill
M. L. Kirkland
INVENTOR
George H. Pfeil
BY
His ATTORNEY

UNITED STATES PATENT OFFICE.

GEORGE H. PFEIL, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC MOTOR.

989,798.

Specification of Letters Patent. Patented Apr. 18, 1911.

Application filed February 4, 1910. Serial No. 542,033.

*To all whom it may concern:*

Be it known that I, GEORGE H. PFEIL, a citizen of the United States, residing in the borough of Swissvale, county of Allegheny, and State of Pennsylvania, have invented a certain new and useful Improvement in Electric Motors, of which the following is a specification.

My invention relates to electric motors, and more particularly to the bushing by means of which the commutator is insulated from the armature shaft of such motors.

In the manufacture of electric motors for commercial purposes, it is sometimes required that the armature should withstand a "break-down" test of high voltages (3,000 volts and over) between the shaft and the segments forming the commutator.

An object of my invention is to provide a novel form of insulation for use between the commutator and shaft of such motors, which will enable them to withstand the required "break down tests."

I will describe a form of bushing embodying my invention, and then point out the novel features thereof in claims.

In the accompanying drawings, Figure 1 is a cross-sectional view showing a motor commutator and shaft having one form of insulating bushing embodying my invention. Fig. 2 is a view showing in section the two telescoping portions of the bushing illustrated in Fig. 1. Figs. 3 and 4 are views showing the developed forms of the parts 7 and 8 of Fig. 2.

Referring now to Fig. 1, the reference character 6 designates a shaft of an electric motor, upon which shaft is mounted a commutator composed of a plurality of segments 9. Between the commutator segments and the shaft are two telescoping portions of insulating material designated by 7 and 8. These two portions are shown separately and more clearly in Fig. 2. A preferred manner of constructing these sleeves or portions of bushings is as follows, although I do not desire to limit myself to any particular means of construction, or to any particular insulating material. The flat insulating material is first cut or punched into blanks of approximately the forms shown in Figs. 3 and 4, a series of parallel slits 15 being cut along the straight edge of each. The sleeves are then formed by rolling these blanks over mandrels and flaring out the ends to form the flanges, as allowed by the slits 15. The flared ends are then made substantially solid by placing one of the washers 10 and 11 of insulating material on each side of the flange, when the whole is placed in a mold and heated under pressure.

Referring again to Fig. 1, it will be seen that when the commutator is assembled, the sleeve 8 is slipped over the sleeve 7, and a practically continuous insulating bushing is obtained. The overlapping distance around the ends of the sleeves where they join is equal to, or greater than, the distance from the commutator bars 9 to the shaft 6 around the outside, hence there is little probability of an electrical break-down within the commutator.

Having thus described my invention, I claim:

1. An insulating bushing for commutators of dynamo-electric machines, comprising two sections adapted to overlap at their meeting edges, each section comprising a sleeve portion and an inwardly inclined end flange adapted to retain the commutator segments.

2. An insulating bushing for commutators of dynamo-electric machines comprising two sections adapted to overlap at their meeting edges, each section comprising a sleeve portion and an expanded end flange integral therewith, the said flange being slanted inwardly toward the middle of the bushing to retain the commutator segments.

3. An insulating bushing for commutators of dynamo-electric machines, comprising two partially telescoping portions, each comprising a sleeve and an end flange substantially integral, the said flange being sloped inwardly to retain the commutator segments.

4. An insulating bushing for commutators of dynamo-electric machines, comprising a sleeve formed of insulating material and having at one end an internal cylindrical recess, and a similar sleeve having at one end an external reduced portion adapted to fit into the recess of the first-mentioned sleeve, thereby forming a substantially continuous bushing.

5. An insulating bushing for commutators of dynamo-electric machines, comprising a sleeve of insulating material having at one end an expanded flange and at the other end an internal cylindrical recess, and a similar sleeve having at one end an expanded flange and at the other end an externally reduced portion adapted to fit into the recess of the first-mentioned sleeve, thereby forming a substantially continuous bushing, the expanded flanges being sloped toward the middle of the bushing to retain the commutator segments.

6. In a commutator for dynamo-electric machines the combination, with commutator segments having triangular projections or lugs, of an insulating bushing comprising two partially telescoping portions, each portion comprising a sleeve and an end flange integral therewith, the said flanges being sloped inwardly to retain the triangular projections on the segments.

7. In a commutator for dynamo-electric machines the combination, with commutator segments having triangular projections or lugs, of an insulating bushing therefor comprising a sleeve of insulating material having at one end an expanded flange and at the other end an internal cylindrical recess, and a similar sleeve having at one end an expanded flange and at the other end an externally reduced portion adapted to fit into the said recess in the first mentioned sleeve, thereby forming a substantially continuous bushing, the said expanded flanges being sloped inwardly to retain the triangular projections on the segments.

In testimony whereof, I have signed my name to this specification in the presence of two subscribed witnesses.

GEORGE H. PFEIL.

Witnesses:
J. G. SCHRENDER,
L. FREDERIC HOWARD.